United States Patent [19]

Baumgartner et al.

[11] 4,386,040
[45] May 31, 1983

[54] METHOD OF PRODUCING LITHIUM NICKEL OXIDE CATHODE FOR MOLTEN CARBONATE FUEL CELL

[75] Inventors: Charles E. Baumgartner, Schenectady; Kenneth P. Zarnoch, Clifton Park, both of N.Y.

[73] Assignee: General Electric Company, Schenectady, N.Y.

[21] Appl. No.: 297,609

[22] Filed: Aug. 31, 1981

[51] Int. Cl.³ .............................................. C04B 35/65
[52] U.S. Cl. .................................. 264/56; 75/0.5 BC; 264/63; 264/104; 419/23; 419/40
[58] Field of Search ........................... 264/63, 56, 104; 75/206, 0.5 BC

[56] References Cited

U.S. PATENT DOCUMENTS

| | | | |
|---|---|---|---|
| 3,148,056 | 9/1964 | Brodie et al. | 75/206 |
| 3,226,264 | 12/1965 | Joseph et al. | 75/206 |
| 3,625,765 | 12/1971 | Arrance | 75/206 |
| 3,658,597 | 4/1972 | Gray | 75/206 |
| 3,730,706 | 5/1973 | Buescher et al. | 75/206 |
| 4,011,052 | 3/1977 | Davies | 75/206 |

*Primary Examiner*—James H. Derrington
*Attorney, Agent, or Firm*—Jane M. Binkowski; James C. Davis, Jr.; James Magee, Jr.

[57] ABSTRACT

A green body comprised of a mixture of nickel powder and lithium oxide is fired in air to produce a porous lithium nickel oxide structure useful as a cathode in a molten carbonate fuel cell.

9 Claims, 1 Drawing Figure

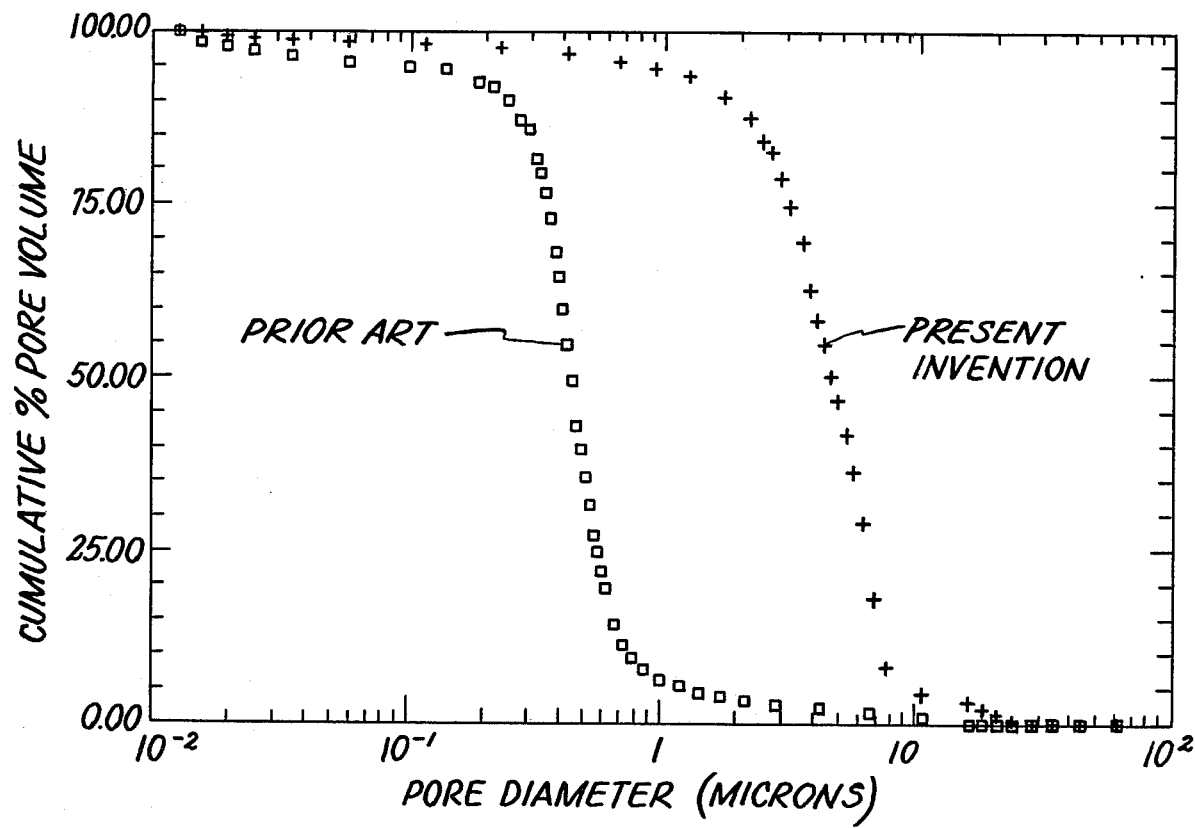

METHOD OF PRODUCING LITHIUM NICKEL OXIDE CATHODE FOR MOLTEN CARBONATE FUEL CELL

The present invention relates to a method of preparing a lithium nickel oxide cathode for a molten carbonate fuel cell. The present cathode requirement appears to be a mean pore size in excess of about 1 to 2 microns, and preferably, a mean pore size of about 4–6 microns, and a total porosity of about 60+% by volume of the total volume of the cathode. However, in some cases, cathodes with a total porosity as low as about 50% by volume have been operable in molten carbonate fuel cells.

The state-of-the-art cathode in molten carbonate fuel cells is prepared by in situ oxidation of a porous nickel plaque. Under fuel cell operating conditions (650° C. in the presence of a 62:38 mole % $Li_2CO_3$:$K_2CO_3$ electrolyte), the nickel is oxidized to NiO containing approximately 2 cation % Li substituted for $Ni^{+2}$ (i.e. to form $Li_{0.02}Ni_{0.98}O$). Oxidation is accompanied by a large volume expansion, considerably altering the initial porosity characteristics of the porous nickel. As electrolyte is redistributed from the electrolyte-supporting matrix which separates the anode from the cathode to the cathode in accordance with their relative pore size distributions, both knowledge and control of the actual electrode pore size distribution are important. The state-of-the-art cathode is generally 60–70% by volume porous with an approximately 6 micron mean pore size.

Another prior art technique comprises cold pressing a NiO+$Li_2CO_3$ powder mixture containing a binder and sintering the pressed body. This results in structures which exhibit sufficient mechanical strength but suffer from porosities and pore size distributions below the cathode design requirements. For example, the accompanying figure shows a mercury porosimetry curve of a LiNiO cathode prepared by this prior art technique wherein a mean pore size of 0.4 micron and porosity of 52% were obtained.

The present method overcomes the disadvantages of the prior art by producing a LiNiO cathode prior to its incorporation in a molten carbonate fuel cell, and the present cathode does not change significantly in volume under fuel cell operating conditions. Also, in contrast to the prior art which uses NiO, the present method uses elemental Ni powder and produces a cathode with a mean pore size and porosity which satisfy present molten carbonate fuel cell cathode requirements.

Those skilled in the art will gain a further and better understanding of the present invention from the detailed description set forth below, considered in conjunction with the figure accompanying and forming a part of the specification, which shows a comparison on a logarithmic scale of the pore size distribution determined by mercury intrusion porosimetry for a lithium nickel oxide cathode produced by the present process using elemental nickel powder and a lithium nickel oxide cathode produced by a prior art process using nickel oxide.

Briefly stated, the present invention is a process for producing a cathode for a molten carbonate fuel cell, said cathode being composed of $Li_xNi_{(1-x)}O$ where x ranges from about 0.005 to about 0.25, which comprises providing a mixture of elemental nickel powder and $Li_2O$ or precursor thereof, said $Li_2O$ or precursor thereof having an average particle size not significantly larger than the average particle size of said elemental nickel powder, forming said mixture into a green body and firing said green body in air at a temperature ranging from about 600° C. to about 1000° C. producing a fired body comprised of said $Li_xNi_{(1-x)}O$, said precursor of $Li_2O$ decomposing at or below said firing temperature to produce $Li_2O$ and by-product gas, said $Li_2O$ or precursor of $Li_2O$ being used in an amount sufficient to produce said $Li_xNi_{(1-x)}O$, said cathode having a porosity of at least about 50% by volume of the total volume of said cathode.

In the present process elemental nickel powder is used. Elemental nickel powder is commercially available in a wide variety of sizes and in different morphologies, for example, in spherical form or in the form of a chain of beads. In the present process, the size, or size distribution, and morphology, or mixture of morphologies of the nickel powder can vary and depends on the final porosity and mean pore size desired in the fired structure, i.e. the present cathode. Specifically, the final porosity and mean pore size of the present cathode are variable by choosing elemental nickel powder of different sizes and morphology. Generally, in the present process, the average size or size distribution of the nickel particles ranges from about one micron to about 10 microns, and ordinarily, it ranges from about 2 microns to about 5 microns.

In the present process, $Li_2O$ or a precursor for $Li_2O$ is used. The precursor for $Li_2O$ is one which decomposes completely at or below the firing temperature to produce $Li_2O$ and by-product gas or gases leaving no contaminants in the final fired product, i.e. cathode. Representative of these precursors is $Li_2CO_3$, $Li_2O_2$ and LiOH.

The $Li_2O$ or precursor thereof is used in the amount which produces $Li_xNi_{(1-x)}O$ where x ranges from about 0.005 to about 0.25. Preferably, for best results, x has a value of about 0.02. Specifically, in the present firing operation, elemental nickel oxidizes to nickel oxide (NiO), the precursor decomposes to produce $Li_2O$, and the $Li_2O$ incorporates or dissolves into the nickel oxide to produce the present $Li_xNi_{(1-x)}O$ cathode. When the present firing is completed, there is no significant amount of elemental nickel, nickel oxide, precursor or $Li_2O$ remaining in the cathode product. An amount of $Li_2O$ insufficient to produce the present composition with the minimum value of x of 0.005 would produce a cathode of insufficient strength to be useful in the molten carbonate fuel cell due to insufficient bonding between the particles. On the other hand, since the maximum value of x of about 0.25 in the present product is the maximum amount of lithium cation which can be incorporated, or dissolved into the nickel oxide, $Li_2O$ in an amount significantly in excess thereof would produce other compositions which would be deleterious to the operation of the cathode in the molten carbonate fuel cell.

In carrying out the present process, the Ni powder and $Li_2O$ or precursors thereof, can be of commercial or reagent grade. Specifically, the reactants should not contain any impurities which would have a significantly deleterious effect on the resulting cathode.

The $Li_2O$, or precursors thereof should be of a size which allows the dissolution or incorporation of $Li_2O$ into NiO to produce the present cathode. Specifically, when used in particulate form, the $Li_2O$ or precursor thereof should be of a fine size, i.e. its average particle size should not be significantly larger, and preferably it is smaller, than the average particle size of the nickel powder used.

The elemental Ni powder and $Li_2O$ or precursors thereof are admixed to produce at least a substantially homogeneous mixture to insure good contact and production of the present $Li_xNi_{(1-x)}O$ composition. The actual mixing operation can be carried out in several ways which do not introduce undesirable impurities into the resulting fired product. Preferably, the elemental Ni powder and $Li_2O$, or precursors thereof, are wet mixed, in a liquid medium in which they are inert to form a slurry, and the liquid medium is evaporated therefrom producing the desired homogeneous mixture. Most preferably, the $Li_2O$ or precursor thereof is dissolved in a suitable solvent, the resulting solution is admixed with the elemental nickel powder and the solvent is evaporated therefrom leaving the $Li_2O$ or precursor thereof in initimate contact with the elemental nickel powder. Any liquid medium or solvent used to promote mixing of the components should have no significant deleterious effect thereon.

The resulting mixture can then be formed into a green body of desired shape and size by a number of techniques. Preferably, the mixture is deposited on an appropriate substrate in the form of a layer or plaque, i.e. a piece with flat faces and pressed at room temperature to impart to it sufficient mechanical strength for handling purposes.

The specific thickness and density of the green body, i.e. unfired body, depends largely on the desired structure of the fired body, i.e. cathode. Specifically, the fired body is of substantially the same size, shape, and porosity, i.e. pore volume and pore size, as the unfired pressed layer or plaque, i.e. the green body.

The green body is fired in air at a temperature ranging from about 600° C. to about 1000° C. At temperatures below about 600° C., the $Li_2O$ does not incorporate or dissolve into the NiO formed in situ to produce the present composition. At temperatures higher than about 1000° C., $Li_2O$ vaporizes readily. Preferably, for best results, firing temperature is about 900° C. and at such temperature, firing is usually completed in about 30 minutes.

The present firing essentially completely oxidizes the elemental nickel to nickel oxide and essentially completely incorporates or dissolves $Li_2O$ within the nickel oxide structure to produce the present $Li_xNi_{(1-x)}O$ composition. Specifically, upon completion of the present firing, there are no significant amounts of elemental nickel or $Li_2O$ present in the present fired cathode product. Also, the present firing produces bonds between the particles, i.e. particle to particle necking occurs, which imparts sufficient mechanical strength to the fired product to make it useful as a cathode in a molten carbonate fuel cell.

Firing time is determinable empirically by analyzing the structure of the product to determine the lithium cation content of the $Li_xLi_{(1-x)}O$ composition. This can be done by a number of standard techniques. For example, it can be done by initially leaching any $Li_2O$ or precursor therefor, which might be present, out of the product and then analyzing the leached structure which consists essentially of lithium nickel oxide for its lithium cation concentration. $Li_2O$ as well as precursor for $Li_2O$ can be leached from the fired product by immersing it in a solvent such as, for example, 50% aqueous acetic acid. The leached structure can be analyzed for its lithium cation content by means of atomic absorption utilizing an atomic absorption spectrometer.

The present cathode is electrochemically active for the reactions of the molten carbonate fuel cell. Generally, the operating temperatures of a molten carbonate fuel cell range from about 600° C. to about 900° C. At the cathode, oxygen and carbon dioxide react to form carbonate via the overall reaction:

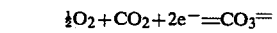

At the anode, hydrogen in the fuel gas reacts with carbonate ions from the electrolyte to form water and carbon dioxide:

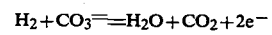

The present cathode, i.e. fired body, usually is in the form of a flat plate with flat faces, i.e. a plaque; and has a total pore volume about 50% but less than about 85% by volume of the total volume of the cathode. It is useful as a cathode in a molten carbonate fuel cell. Preferably, the present cathode has a pore volume greater than about 60% of the total volume of the cathode, since the higher the surface area of the cathode, the better is its performance. The specific pore volume and pore size or pore size distribution of the present cathode is determinable empirically and depends largely on the porosity of the matrix supporting the carbonate electrolyte as well as the operating conditions of the cell. For best results, the cathode should have a pore volume and pore size distribution which allow enough electrolyte to enter it to accomplish reaction but not so much as to "flood" it to the point where the reacting gas cannot diffuse rapidly to its reaction sites. Small pores in the cathode or matrix for the electrolyte retain electrolyte in preference to large pores. In order for the cathode to perform well, it must take up enough electrolyte to allow the cell reaction; yet it must not take up so much electrolyte that the gas cannot diffuse rapidly to and from the reaction sites. Preferably, therefore, the cathode should have some percentage of pores which are smaller than pores in the matrix for the electrolyte to retain electrolyte and a larger percentage of pores which are greater than pores in the matrix for the electrolyte so as to remain dry. Generally, the mean pore size of the present cathode ranges from in excess of one micron to about 10 microns, and preferably its mean pore size from about 3 microns to about 6 microns. Also, generally, the pores in the present cathode range in size from about 0.1 micron to about 20 microns, and frequently they range from about 2 microns to about 10 microns. The present cathode ranging in thickness from about 0.01 inch to about 0.1 inch, and preferably in the form of a plaque or plate with flat faces, is useful as a cathode in a molten carbonate fuel cell. Also, preferably, for a molten carbonate fuel cell, the present cathode would be in the form of about a 4-inch square.

The invention is further illustrated by the following examples:

EXAMPLE 1

In this example, a prior art technique utilizing nickel oxide was used to try to prepare a cathode for a molten carbonate fuel cell.

50.0 grams of reagent grade NiO having an average particle size of less than about 1 micron and 0.55 gram of reagent grade $Li_2CO_3$ having an average particle size of less than 1 micron were dry mixed in a mortar and pestle. 0.50 gram of stearic acid and 1.5 grams of polymethyl methacrylate were dissolved in 60 ml acetone. The particulate mixture of $Li_2CO_3$ and NiO was then added to this solution, and the resulting slurry was then evaporated to dryness while being stirred with a spatula and followed by drying under a vacuum at 125° C. for 16 hours.

The resulting mixture was ground in a mortar and pestle and then sieved through a −200 mesh screen.

The resulting sieved particulate mixture was doctored into a layer about 0.020 inch thick and 4 inches square between alumina paper, and pressed (still between the alumina paper) in a graphite die press at room temperature under a pressure of 150 psi for about 5 minutes. The resulting green plaque or pressed layer had a thickness of about 0.015 inch and was 54 inches square. This green plaque was placed in a furnace at room temperature and fired open-face (without any cover thereon or any external pressure applied thereto), in air at atmospheric pressure at 900° C. for 30 minutes. Heating and cooling were at furnace rate, i.e. it took approximately 2 hours to reach the firing temperature of 900° C., and the fired product was then furnace-cooled to room temperature in about 16 hours.

The resulting porous structure was black in color, 4 inches square and 0.015 inch thick.

The porosity of this structure was analyzed by mercury intrusion porosimetry and the results are shown in the accompanying figure as the prior art curve. It had a mean pore size of 0.4 micron and a total porosity of 52% by volume of the total volume of the structure. The low volume of porosity and mean pore size of this structure would prevent its use as a cathode in a molten carbonate fuel cell.

The structure was immersed in 50% aqueous acetic acid at room temperature for about 16 hours to leach out any $Li_2O$ or $Li_2CO_3$ which might be present, rinsed with distilled water and dried in air at 125° C.

The theoretical content of lithium cation in the structure was calculated to be 2.18 cation %. Chemical analysis, i.e. atomic absorption, of this structure showed that it contained 1.95 lithium cation %. The composition of the fired structure, therefore, would necessarily consist essentially of $Li_{0.0195}Ni_{0.9805}O$. X-ray diffraction analysis of the fired structure showed only LiNiO and did not show any NiO, $Li_2O$ or $Li_2CO_3$.

EXAMPLE 2

This example illustrates the present invention. 73.87 grams of commercial grade elemental nickel powder, spherical in form and having an average particle size ranging from about 3 microns to about 4 microns was used.

The nickel powder was dry mixed in a mortar and pestle with 1.44 grams of reagent grade $Li_2CO_3$ having an average particle size less than 1 micron.

1.0 gram of stearic acid and 3.0 grams of polymethylmethacrylate were dissolved in 20 ml acetone. The mixture of $Li_2CO_3$ and elemental nickel powder was then added to this solution and the resulting slurry was evaporated to dryness while being stirred followed by drying under a vacuum at 125° C.

The resulting mixture was ground in a mortar and pestle and then sieved through a −200 mesh screen.

The resulting sieved particulate mixture was doctored into a layer about 0.020 inch thick and 4 inches square between alumina paper, and pressed (still between the alumina paper) in a graphite die press at room temperature under a pressure of 150 psi for about 5 minutes. The resulting green plaque or pressed layer had a thickness of about 0.015 inch and was 4 inches square. This green plaque was placed in a furnace at room temperature and fired open-faced (without any cover thereon or any external pressure applied thereto) in air at atmospheric pressure at 900° C. for 30 minutes. Heating and cooling were at furnace rate, i.e. it took approximately 2 hours to reach the firing temperature of 900° C., and the fired product was then furnace-cooled to room temperature in about 16 hours.

The resulting porous structure was black in color, 4 inches square and 0.015 inch thick.

The porosity of this structure was analyzed by mercury intrusion porosimetry to determine pore size and the results are shown in the accompanying figure as the curve of the present invention. A comparison of the curve of the present invention with the curve of the prior art illustrates the significantly higher percentage of larger sized pores produced by the present process.

The present fired structure had a mean pore size of 4.7 microns and a total porosity of 68% by volume of the total volume of the structure.

The theoretical content of lithium cation in the structure was calculated to be 3.0 cation %.

The structure was immersed in 50% aqueous acetic acid at room temperature for about 16 hours to leach out any $Li_2O$ or $Li_2CO_3$ which might be present, rinsed with distilled water and dried in air at about 125° C.

Optical examination of this fired structure showed that the grains therein were well bonded to each other. This structure would be useful as a cathode in a molten carbonate fuel cell.

From past work it was known that the elemental nickel powder oxidized readily to NiO within a few minutes in air at 600° C.

Chemical analysis, i.e. atomic absorption, of the resulting structure showed that it contained 2.9 lithium cation %. X-ray diffraction analysis of the fired structure showed only LiNiO and did not show any NiO, $Li_2O$ or $Li_2CO_3$. This indicates that complete dissolution of the lithium cation into the nickel oxide had taken place and that the composition of this structure would necessarily be $Li_{0.029}Ni_{0.971}O$.

EXAMPLE 3

This example illustrates the present invention. 184.7 grams of commercial grade elemental nickel powder, spherical in form, with an average particle size ranging from about 3 microns to about 4 microns, and 7.42 grams of reagent grade $Li_2CO_3$ with an average particle size of less than 1 micron, were placed in a 500 ml plastic bottle along with about 20 α-alumina grinding media pellets (1 cm diameter × 1 cm length), and roll-milled (~100 rpm) for 90 minutes.

The resulting particulate mixture was placed in a mortar and pestle containing sufficient acetone to make a slurry and was ground for about 15 to 30 minutes until the acetone evaporated. The ground mixture was sieved through a 20 mesh screen.

The resulting sieved mixture was doctored smooth into a graphite mold (3.5 inches square and 0.040 inch deep) filling the mold, then covered with a 0.020 inch graphite shim, and pressed at room temperature under 800 psi for about 5 minutes. The resulting green plaque, i.e. green plate with flat faces, was 3.5 inches square and 0.020 inch thick. It was placed on alumina paper, covered with an alumina plate (1 lb) and placed in a furnace at room temperature and fired at 900° C. in air for 30 minutes. The furnace heating rate took 20 hours to reach the firing temperature of 900° C., and the fired product was then furnace-cooled to room temperature in 20 hours.

The resulting fired structure was a plaque or plate with flat faces, black in color, and 3.5 inches square and 0.020 inch thick. It was analyzed by mercury intrusion porosimetry which showed it to have a mean pore size of 5.1 microns and a total porosity of 67% by volume of the total volume of the structure.

The theoretical content of lithium cation in the structure was calculated to be 6.0 cation %.

The structure was immersed in 50% aqueous acetic acid at room temperature for about 16 hours to leach out any $Li_2O$ or $Li_2CO_3$ which might be present, rinsed with distilled water and dried in air at about 125° C. Chemical analysis, i.e. atomic absorption, of the resulting leached structure showed that it contained 6.0 lithium cation %. This indicates that complete dissolution of the lithium cation into the nickel oxide had taken place and that the composition of this structure necessarily would consist essentially of $Li_{0.06}Ni_{0.94}O$.

Optical examination of this fired structure showed that the grains therein were well bonded to each other. This structure would be useful as a cathode in a molten carbonate fuel cell.

EXAMPLE 4

This example illustrates the present invention. The procedure used in this example was the same as that disclosed in Example 3 except as noted herein.

43.80 grams of commercial grade elemental nickel powder was used. This powder was in the form of small chains of beads with the individual chained-bead ranging in average particle size from about 3 microns to about 4 microns and a chain generally being comprised of about 10 to 20 beads.

2.00 grams of $Li_2CO_3$ were used with an average particle size of less than one micron.

The resulting green plaque was placed on alumina paper and was placed open-faced (without an alumina plate thereon) into the furnace.

The resulting fired structure was analyzed by mercury intrusion porosimetry which showed it to have a mean pore size of 3.5 microns and a total porosity of 62% by volume of the total volume of the structure.

The theoretical content of lithium cation in the structure was calculated to be 6.77 cation %. From past substantially similar experiments, it could be assumed that the fired structure consisted essentially of $Li_{0.06}Ni_{0.94}O$ and did not contain any significant amount of NiO or $Li_2CO_3$.

Optical examination of this fired structure showed that the grains therein were well bonded to each other. This structure would be useful as a cathode in a molten carbonate fuel cell.

EXAMPLE 5

This example illustrates the present invention.

A fired structure, i.e. the present cathode, was prepared in the same manner as disclosed in Example 3.

It was tested as a cathode in a molten carbonate fuel cell wherein the anode was comprised of porous nickel containing 10% by weight chromium. The electrolyte structure in the fuel cell was composed of 45% by weight $LiAlO_2$ and 55% by weight of a 62 mole percent $Li_2CO_3$:38 mole percent $K_2CO_3$ electrolyte. After 200 hours of operation at 650° C., the fuel cell performance was 0.135 ampere at 0.700 volt. At the time of the present filing, the cell was still in operation.

Typically a molten carbonate fuel cell with a state-of-the-art lithium nickel oxide cathode, i.e. a cathode which is produced by in situ oxidation of a porous nickel plaque after 200 hours of operation at 650° C. would exhibit a cell performance of between 0.140 ampere to 0.100 ampere at 0.700 volt.

This indicates that the cathode produced in accordance with the present invention performs in a molten carbonate fuel cell as well as the state-of-the-art cathode.

EXAMPLE 6

This example illustrates the present invention. 38.90 grams of commercial grade elemental nickel powder, spherical in form and having an average particle size ranging from about 3 microns to about 4 microns was used.

The nickel powder was dry mixed in a mortar and pestle with 0.81 grams of reagent grade $Li_2CO_3$ having an average particle size less than 1 micron.

0.5 gram of stearic acid and 1.5 grams of polymethylmethacrylate were dissolved in 25 ml acetone. The mixture of $Li_2CO_3$ and elemental nickel powder was then added to this solution and the resulting slurry was evaporated to dryness while being stirred followed by drying under a vacuum at 125° C. The resulting mixture was sieved, formed into a green body and fired in the same manner as disclosed in Example 2.

The theoretical content of lithium cation in the structure was calculated to be 3.2 cation %. The structure was immersed in a 50% aqueous acetic acid solution at room temperature for about 16 hours to leach out any $Li_2O$ or $Li_2CO_3$ which might be present, rinsed with distilled water and dried in air at about 125° C.

Chemical analysis, i.e. atomic absorption, of a portion of the resulting structure, showed that it contained 2.6 cation % of Li. From past work and taking into consideration the standard deviation of the analytical technique, this would indicate that essentially complete dissolution of the Li cation into NiO had taken place, and therefore, this structure, i.e. cathode, would necessarily consist essentially of $Li_{0.026}Ni_{0.074}O$.

Optical examination of this structure showed that the grains therein were well bonded to each other.

The porosity of this cathode was analyzed by mercury intrusion porosimetry which showed it to have a mean pore size of 5.7 microns and a porosity of 60.5% by volume of the total volume of the structure.

This cathode was tested under conditions which simulated those of a molten carbonate fuel cell. Specifically, the electrolyte structure was composed of 45% by weight $LiAlO_2$ and 55% by weight of a 62 mole % $Li_2CO_3$:38 mole % $K_2CO_3$ electrolyte.

The cathode was placed on top of the electrolyte structure, coextensive therewith, the resulting structure was placed between stainless steel plates with a 5 pound stainless steel weight on the top and the entire structure was then placed in a furnace. The furnace was provided with an atmosphere which was substantially the same as it would have been in a molten carbonate fuel cell, i.e. the furnace atmosphere was comprised of 30% by volume $CO_2$ and 70% by volume air. The furnace was heated to a temperature of 650° C. and maintained at 650° C. for 500 hours. At the end of this time, heating was stopped, and the structure was furnace-cooled to room temperature.

The cathode was recovered, immersed in a 50% aqueous acetic acid solution at room temperature for about 16 hours to remove any electrolyte, washed with distilled water and dried in air at 125° C.

Examination of the cathode showed that it had not changed significantly in thickness or porosity. Specifically, the cathode was again analyzed by mercury intrusion porosimetry and found not to have a porosity of 60.0% by volume of the total volume of the cathode and a median pore size of 5.5 microns.

What is claimed is:

1. A process for producing a cathode for a molten carbonate fuel cell, said cathode being composed of $Li_xNi_{(1-x)}O$ where x ranges from about 0.005 to about 0.25, which consists essentially of providing a mixture of elemental nickel powder and $Li_2O$ or precursor thereof, said $Li_2O$ or precursor thereof having an average particle size not significantly larger than the average particle size of said elemental nickel powder, forming said mixture into a green body and firing said green body in air at a temperature ranging from about 600° C. to about 1000° C. producing a fired body comprised of said $Li_xNi_{(1-x)}O$, said precursor of $Li_2O$ decomposing at or below said firing temperature to produce $Li_2O$ and by-product gas, said $Li_2O$ or precursor of $Li_2O$ being used in an amount sufficient to produce said $Li_xNi_{(1-x)}O$, said cathode having a porosity of at least about 50% by volume of the total volume of said cathode.

2. The process according to claim 1 wherein x has a value of about 0.02.

3. The process according to claim 1 wherein the firing temperature is about 900° C.

4. The process according to claim 1 wherein said precursor for $Li_2O$ is selected from the group consisting of $Li_2CO_3$, $Li_2O_2$ and LiOH.

5. The process according to claim 1 wherein said nickel powder has an average particle size ranging from about 1 micron to about 5 microns.

6. The process according to claim 1 wherein said $Li_2O$ or precursor thereof has an average particle size smaller than the average particle size of said nickel powder.

7. The process according to claim 1 wherein said $Li_2O$ or precursor thereof is in the form of a solution before being mixed with said nickel powder, and wherein said solvent is evaporated from said mixture before it is formed into a green body, said solvent having no significantly deleterious effect on said nickel powder or said $Li_2O$ or precursor thereof.

8. The process according to claim 1 wherein said green body and said fired body is in the form of a plaque or plate with flat faces.

9. The process according to claim 8 wherein said fired plaque ranges in thickness from about 0.01 inch to about 0.1 inch.

* * * * *